United States Patent [19]

Ries

[11] Patent Number: 4,559,576
[45] Date of Patent: Dec. 17, 1985

[54] PROTECTION DEVICE FOR A SUPERCONDUCTING MAGNETIC COIL ASSEMBLY

[75] Inventor: Günter Ries, Erlangen, Fed. Rep. of Germany

[73] Assignee: Siemens Aktiengesellschaft, Berlin and Munich, Fed. Rep. of Germany

[21] Appl. No.: 574,783

[22] Filed: Jan. 27, 1984

[30] Foreign Application Priority Data

Feb. 2, 1983 [DE] Fed. Rep. of Germany ....... 3303449

[51] Int. Cl.[4] .............................................. H02H 9/00
[52] U.S. Cl. ..................................... 361/19; 361/141; 335/216
[58] Field of Search ................... 361/19, 141; 335/216

[56] References Cited

U.S. PATENT DOCUMENTS

| | | | |
|---|---|---|---|
| 3,419,794 | 12/1968 | Weaver, Jr. et al. | 335/216 X |
| 3,450,952 | 6/1969 | Nelson | 335/216 X |
| 3,474,295 | 10/1969 | Marshall | 361/19 |

FOREIGN PATENT DOCUMENTS

| | | | |
|---|---|---|---|
| 1764369 | 4/1971 | Fed. Rep. of Germany | |
| 2301152 | 7/1973 | Fed. Rep. of Germany | |
| 1539825 | 12/1973 | Fed. Rep. of Germany | |
| 2521328 | 11/1975 | Fed. Rep. of Germany | |
| 1614964 | 12/1975 | Fed. Rep. of Germany | |
| 2324371 | 10/1977 | Fed. Rep. of Germany | |
| 1463292 | 2/1977 | United Kingdom | 361/19 |

OTHER PUBLICATIONS

IEEE Transactions on Magnetics, vol. MAG-15, No. 1, Jan. 1979, pp. 855 to 850, "Quench Protection for a 2-MJ Magnet", by Taylor et al.
IEEE Transactions on Magnetics, vol. MAG-17, No. 5, Sep. 1981, pp. 1815 to 1822, "Some Basic Problems in Superconducting Magnet Design", M. Wilson.
The Review of Scientific Instruments, vol. 34, No. 4, Apr. 1963, pp. 368 to 373, "Protection of Superconducting Coils", P. F. Smith.
IEEE Transactions on Nuclear Science, vol. NS-24, No. 3, Jun. 1977, pp. 1318 to 1319, "Superconducting Magnet Quench Protection for Isabelle", Robins et al.

Primary Examiner—Patrick R. Salce
Attorney, Agent, or Firm—John Francis Moran

[57] ABSTRACT

The device is for a superconducting magnetic coil assembly that is to be cryogenically cooled by a liquid coolant, and is subdivided into several partial winding sections that are connected one after the other to protect the assembly in the event of an unintended transition from the superconducting state to the normal conducting state. A protective resistor is connected in parallel with each partial winding section and the ends of adjacent partial winding sections that face one another are connected to the corresponding ends of their respective protective resistors by a common section of an electrical conductor. With a passive protection device of this kind, it should be possible to use protective resistors with a relatively small mass. According to the invention, the protective resistors are located in the exhaust gas stream of the coolant, and in each of the sections of the conductor that are common to adjacent partial winding sections there is located a small auxiliary resistor. Two electrical heating elements are connected in parallel to each auxiliary resistance. The heating elements are in thermal contact with the two adjacent partial winding sections, which are connected with the respective auxiliary resistors. In addition, it is advantageous to provide a superconducting persistent-current switch with which the partial winding sections that are connected one after the other can be short-circuited.

15 Claims, 2 Drawing Figures

PROTECTION DEVICE FOR A SUPERCONDUCTING MAGNETIC COIL ASSEMBLY

BACKGROUND OF THE INVENTION

The invention relates to a device for the protection of a superconducting magnetic coil assembly that is to be cryogenically cooled by a liquid coolant when there is an unintended transition from the superconducting state to the normal conducting state. In the device the magentic coil assembly is subdivided into several partial winding sections that are connected one after another; each partial winding section is connected in parallel with a protective resistor with a predetermined ohmic value such that the ends of adjacent partial winding sections that face one another are connected to the corresponding ends of their respective protective resistors by a common section of an electrical conductor. A protection device of this type for a superconducting magnetic coil assembly is disclosed in published German patent application DE-OS No. 23 01 152.

Superconducting magnetic coils, such as those of a typical coil assembly, can frequently also be operated with short-circuiting. This is because once the magnetic field of such a coil has been set up there is virtually no need to feed in additional electrical energy from outside to maintain this field. To store the electrical energy that has been fed into the coil, it is therefore possible to short-circuit its winding at its ends by means of a persistent current switch with the lowest possible resistance (cf. published German patent application DE-OS No. 25 21 328, German patent DE-PS No. 23 24 371). The current then flows almost undamped in the resulting short-circuited electric circuit, and all the electrically conducting connections between the low-temperature area of the coil and the external room temperature, such as the leads from the power supply that are necessary to excite the magnetic coil, can then be interrupted to reduce the heat flow into the low-temperature area of the coil.

In the larger superconducting magnetic coils substantial quantities of energy, which might be in the MJ range, can be stored. These magnetic coils in particular are severely endangered in the event of an unintended transition from the superconducting operating state to the normal-conducting state even if this transition (also known as a "quench") initially occurs only in part of the coil. Due to the low heat capacity of the superconducting coil wires, the wire very rapidly reaches a high temperature after the transition from the superconducting to the normal conducting state, because of the resulting increase in resistance. At the same time its specific resistance also rises very rapidly, causing the heating to accelerate further. The result in this case is over-voltages, which put stress on the insulation. In order to protect the larger superconducting magnetic coils from damage or destruction caused by overheating or by electrical arc-overs, special procedures are required. These procedures include, for example, the division of the magnetic coils into several partial winding sections, which are bridged in each case with ohmic protective resistors (cf. published German patent application DE-OS No. 23 01 152), semi-conductor diodes (cf. published German patent application DE-OS No. 16 14 964) or arresters or overvoltage diverters (cf. published German patent application DE-OS No. 17 64 369), in order to limit the voltage. Another typical technique to limit the temperature in the superconducting magnetic coil is to accelerate the proliferation of the normally conducting areas. This can be accomplished with a current impulse through the coil winding or with a common winding form, made for example of aluminum, which is heated by eddy currents and generates new normally conducting areas in the magnetic coil (cf. "IEEE Transactions on Magnetics", Vol. MAG-15, No. 1, January 1979, pages 855 to 859). In addition, it is also possible to promote the quench proliferation by means of electrical heating elements on the windings, which are activated by a special quench detector and fed by an external power supply (cf. "IEEE Transactions on Magnetics," Vol. MAG-17, No. 5, September 1981, pages 1815 to 1822).

For purposes of reliability, however, it is frequently desirable to provide a passive protection device for a magnetic coil of this type, which performs its voltage-limiting and temperature-limiting functions without the activation of active elements, such as quench detectors, switches and externally-fed heaters.

The parallel protective resistors at the partial winding sections of the superconducting magnetic coil, which are provided for the protection device according to previously discussed published German patent application DE-OS No. 23 01 152, are to be regarded as a protection device of this kind. The protective effect of these resistors, which is to form a parallel path to the quenched, and therefore high-impedance winding for the current flowing in the other windings, raises a question as to the thermal loading capacity of these resistances. In the larger magnetic coils an output of up to 100 kW and more might have to be converted in such a resistance as the result of a quench. If the quench does not extend to the other partial winding sections, then the entire stored energy of the magnetic coil would be converted into heat in this resistor. In some applications it is desirable to arrange the resistances in the cryogenic environment close to the coil in order to avoid heat leakage through the many electrical connections between the partial winding sections and the protection resistors. In this case effective removal of thermal power may not be possible. In other words, the greater part of the energy would have to be absorbed by the resistor by raising the temperature of its mass. In order to limit the heating to a predetermined maximum temperature of, for example, a few 100° K., the mass of each resistor would have to be relatively large (of the order of several tens of kilograms). Protective resistors having such a large mass, however, are often undesirable.

SUMMARY OF THE INVENTION

The object of the present invention is to provide the above-mentioned passive protection device for use with resistors with a relatively small mass In general, the invention features a device for the protection of a superconducting magnetic coil assembly that is to be cryogenically cooled by a liquid coolant, when there is an unintended transition from the superconducting state to a normal-conducting state, in which the magnetic coil assembly is subdivided into several partial winding sections that are connected one after another, with each of which a protective resistor with a predetermined ohmic value is connected in parallel so that the ends of adjacent partial winding sections that face one another are connected to the corresponding ends of their respective protective resistors by a common section of an electrical conductor, wherein the protective resistors are located in a exhaust gas stream of the coolant; in each section of the conductor that is common to adjacent partial winding sections there is located an auxiliary resistor whose ohmic value is smaller than that of each of the protective resistors assigned to it; and to each auxiliary resistance, two electrical heating elements are connected in parallel, which are in thermal contact with the two adjacent partial winding sections which are connected with the respective auxiliary resistor.

The partial winding sections of the superconducting magnet are thus bridged by protective resistors that are located in the exhaust gas stream of the cryogenic medium used to cool the superconducting magnetic coil assembly. The advantages associated with designing the protection device in accordance with the invention include the fact that the heat capacity, and therefore the mass, of these resistors can be kept relatively small, as the discharge in the event of a quench is accelerated by proliferation of this transfer by means of the heating elements to the entire coil assembly. The majority of the stored energy is consequently converted evenly into heat in all the coil winding sections. Since the heating elements are fed by internal voltages that occur, in the event that a partial winding is quenched, as a voltage drop in the auxiliary resistors to the protective resistors, as a result of the redistribution of the current, the protection device is accordingly passive and needs no electrical connections with the outside. Therefore, the losses of coolant due to the introduction of heat are correspondingly small.

It is particularly advantageous if the partial winding sections of the magnetic coil assembly that are connected one after the other, are short-circuited by means of a superconducting persistent-current switch. The persistent current switch can, in particular, be bridged electrically by at least one cooled protective element in the operating state, which takes over at least the greater part of the operating current in the event the persistent-current switch starts to conduct normally.

In preferred embodiments of the protection device the auxiliary resistors are located in the exhaust gas stream of the coolant; the ohmic value of each auxiliary resistance is at least 5 times smaller than the value of the protective resistor connected to it; the ohmic value of each heating element is at least 10 times larger than that of the respective auxiliary resistor; the device further includes a superconducting persistent current switch useable for short-circuiting the magentic coil assembly that are connected one after the other; the superconducting persistent-current switch is a short-circuit switch that is activated by means of a heating coil; the superconducting persistent-current switch is cooled with the liquid coolant of the magnetic coil assembly; the superconducting persistent-current switch is electrically bridged in the operating state by at least one cooled protective element, which, in the event that the persistent-current switch becomes normally conducting, takes over at least the greater part of the operating current; the cooled protective element is a mechanical short-circuit switch; the short-circuit switch is cooled with a liquid coolant used to cool the magnetic coil assembly; at least one diode is provided as a cooled protective element; connected in series with the diode is at least one ohmic resistor, with which another electrical heating element with a greater ohmic value is connected in parallel at one of the partial winding sections of the magnetic coil assembly; the diode and its series resistor are located in the exhaust gas stream of the coolant; and metallized plastic film is provided as the heating element.

Other features and advantages of the present invention will become apparent from the following detailed description, and from the claims.

For a full understanding of the present invention, reference should now be made to the following detailed description and to the accompanying drawings.

DETAILED DESCRIPTION

Figure 1:
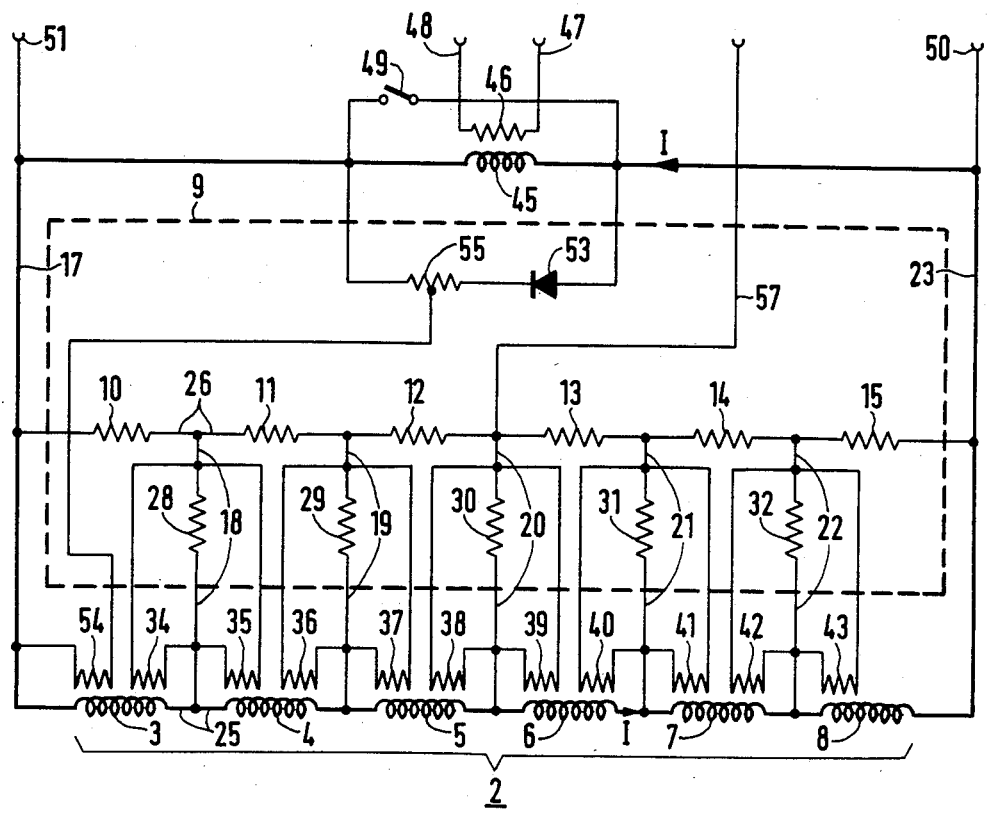
FIG. 1 shows schematically a preferred embodiment of the circuit for a protection device for a superconducting magnetic coil assembly.
Figure 2:
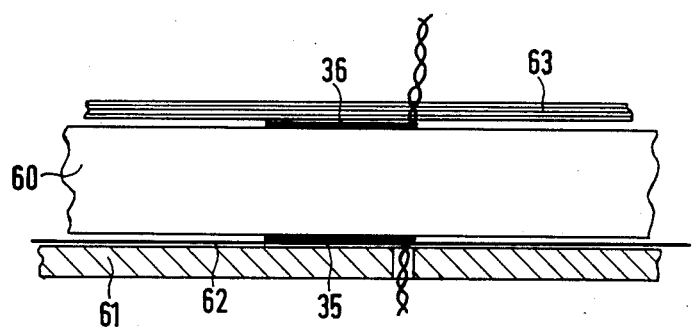
FIG. 2 shows a preferred arrangement of the heating elements at the respective partial winding sections of the protection device.

Referring to FIG. 1, a circuit for a protection device for a superconducting magnetic coil assembly is shown. FIG. 2 shows one possible arrangement of the heating elements of this protection device at the respective partial winding sections.

For the circuit shown in FIG. 1 a superconducting magnetic coil assembly 2, which comprises six partial winding sections or partial coils 3 to 8, arranged in series, is used. Up to the components located in the zone outlined by broken line 9, all the parts indicated in the circuit should be located in the area of the liquid helium used as a coolant to cool superconducting magnetic coil assembly 2. This cooling is effected by arranging the parts, for example, in a bath of the liquid helium within an appropriate cryostatic temperature regulator.

Due to the relatively high inductance of the coil assembly up to 100 H and higher, and to a limitation, required for reasons of insulation, of the voltages within the partial coils to, for example, 500 V, it is not possible to couple out energy from the coil assembly into an external resistor quickly. It is also impossible to use a transformer to couple out by means of a secondary winding, since such a winding can not be manufactured with the required high electrical time constant. The stored energy must therefore be converted into heat. For this purpose, each of the six partial coils 3 to 8 is bridged with an ohmic protective resistor 10 to 15, all of which might, for example have the same resistance value amounting to between 0.2 and 2 ohms (cf. "The Review of Scientific Instruments," Vol. 34, No. 4, April 1963, pages 368 to 373). These protective resistors 10 to 15, like the respective partial coils 3 to 8 are connected one after the other in a chain. The connection in parallel between the protective resistors and the respective partial winding sections is achieved by means of transverse connections 17 to 23, between the chain of protective resistors and the chain of partial coils. In making these connections, the ends of adjacent coils that face one another are connected in each case by means of a common wire (18 to 22) to the corresponding ends of their assigned protective resistors. Therefore, the example, common wire 18 leads from connection 25 between two partial coils 3 and 4 to connection 26 between two assigned protective resistors 10 and 11. The other wires 19 and 22 are arranged in a corresponding manner. In order to limit the output loss in the six protective resistors 10 to 15 when magnetic coil assembly 2 is excited (activated) and de-energized (deactivated), and, in so doing, to avoid the substantial quantities of the liquid helium that cools partial coils 3 to 8, the protective resistors are thermally decoupled from the liquid helium inasmuch as they are located in the exhaust gas stream of this coolant. In this manner, the enthalpy of the helium gas is fully utilized, without substantial excess consumption of liquid helium. The area of the helium exhaust gas stream is indicated in the circuit by broken line 9.

In addition, the thermal load on protective resistors 8 to 15 in the event of a quench is designed to be limited by the fact that the quench is extended to the entire coil assembly, by means of special heating elements installed at the individual partial coils. This causes all the coil currents to drop rapidly and the major part of the stored energy is evenly consumed to a large extent in the winding volume, which forms the main part of the cold mass, while only a small part is converted to heat in the protective resistors. The protective resistors can then be made correspondingly smaller.

Therefore, according to the invention a passive system is provided with the heating elements, inasmuch as the feed voltages for the heating elements are tapped from auxiliary resistors with low resistances located between the chains of partial coils and protective resistors. Accordingly, in wiring sections 18 to 22 which are common to adjacent partial windings, there is in each case an auxiliary resistor 28 to 32, whose resistance is preferably at least five times smaller as that of each of the connected protective resistors. These auxiliary resistors at the same time provide further protective resistances for partial coils 3 to 8, and are installed in the helium exhaust gas stream like protective resistors 10 to 15. To each of these auxiliary resistors 28 to 32, two electrical heating elements are connected in parallel. These heating elements, which, according to the embodiment selected, can have a resistance that is substantially larger (for example, at least 10 times larger) than their assigned auxiliary resistor, are in each case in thermal contact with the two adjacent partial winding sections which are connected with the respective auxiliary resistor. Thus, for example, from auxiliary resistor 28, which is located in wiring section 18 that is common to two partial coils 3 and 4, are tapped the feed voltages for two heating elements 34 and 35, which are arranged in thermal contact with partial coils 3 and 4 respectively. In a similar manner, the heating elements 36 to 43 are fed with voltages tapped at auxiliary resistors 29 and 32. Now if the current in one of partial coils 3 to 8 drops as the result of the quench, equalizing currents will flow through the auxiliary resistor assigned to that coil. The heating elements belonging to two partial coils that are connected to this resistor, then extend the quench to the respective adjacent partial coils.

As can also be seen from the circuit shown in FIG. 1, the chain of partial coils 3 to 8 is short-circuited by means of superconducting persistent-current switch 45. This switch is a short-circuit switch, which can be switched between the superconducting and normal-conducting states thermally by means of heating coil 46 (cf., e.g., DE-AS No. 15 39 825.)

It is advantageous to have this heating coil connected with an external power supply at terminals 47 and 48, only during the activation and deactivation phases e.g. during the exciting and de-energizing phases of the magnetic coil assembly. If necessary, however, other types of superconducting switches can also be used. The persistent-current switch is likewise placed in the bath of liquid helium that cools the magnetic coil assembly. In the undisturbed operating state it carries the rated current I, whose direction of flow is shown by arrows on the short circuit that is indicated in the Fig. by heavier lines. Protective measures must be taken for this switch as well, to prevent damage in the event of an unintended transition into the normal-conducting state. Therefore, two protective elements are indicated in the circuit, with which persistent-current switch 45 is electrically bridged in the operating state. In the first place, a mechanical short-circuit switch 49 can be connected in parallel with persistent-current switch 45. This short-circuit switch, which should also be placed in the helium bath, is closed after the rated current I has been reached, with however, the current feeds still being connected at terminals 50 and 51. This switch then protects the superconducting persistent-current switch 45. Excessive requirements are not imposed on its resistor. It is opened only when magnetic coil assembly 2 is activated or deactivated in the course of operation, at which time the persistent current switch is protected by a parallel power supply or an external discharging resistor.

A second possibility is bridging superconducting persistent-current switch 45 by means of a current circuit which includes at least one cold diode 53 (cf. "IEEE Transactions on Nuclear Science," Vol. NS-24, No. 3, June 1977, pages 1318 to 1319). This cold diode is normally operating in the flow direction, but during exciting phase it is operated in the cutoff direction. Its forward voltage of about 1 V is not detrimental to the persistent-current switch. The essential advantage of such a diode is that at helium temperature it blocks even in the flow direction. Only when there is a quench in the switch does the diode switch to conducting within a few microseconds at the ensuing higher voltages as a result of thermal feedback; and therefore the switch is protected. However, in order to rule out the possibility that, due to the forward voltage of from 1 to 2 V at the terminals, the persistent current switch will no longer become superconducting again and the entire magnetic energy would be converted, in the diode an additional quench release has been provided in magnetic coil assembly 2 by means of another heating element 54. According to the voltage fed to heating elements 34 to 43, heating element 54, which might, for example, be installed at partial coil 3, is fed by the voltage drop at a small resistor 55 which is connected in series with diode 53 in the event of a quench in persistent-current switch 45. With the aid of heating element 54, first partial coil 3 is brought into the normal conducting state, and after that, with the aid of auxiliary resistors 28 and 32 and heating elements 35 to 43 the other partial coils 4 to 8 are also brought into the normal-conducting state. Diode 53 and its series resistance 55 will preferably also be located in the helium exhaust gas stream.

As shown in FIG. 1, electrical wire 57 is connected to the chain of protective resistors 10 to 15. This wire is used to connect a quench detector to magnetic coil assembly 2 when mechanical short-circuit switch 49 is open; but only in the event that an external power supply is coupled to the magentic coil assembly during its activation or deactivation phases. This detector's job is to switch off the external power supply in the event that a quench occurs during these phases in a partial coil or in the entire coil assembly. In this case, however, it is necessary to ensure that the external circuit remains closed, for example, by means of a recovery diode in the power supply or by means of an external discharge resistor.

According to FIG. 1, it is assumed that heating elements 34 to 43 and respective auxiliary resistances 28 to 32 in each case consist of components that are separate from one another. If necessary, however, it is possible that the heating elements can also be used, at least in some cases, as the corresponding auxiliary resistors, such as having the heating elements also take on the functions of the auxiliary resistors.

FIG. 2 gives a schematic representation of a part of a section through a winding pack 60 of a partial coil of magnetic coil assembly 2, for which the protective device shown in FIG. 1 is intended. For reasons of simplification, the winding pack has been straightened out in the drawing. It is wrapped around bobbin 61, which is surrounded by non-helium transparent insulation 62. A surface heating element is mounted on both the inner and outer side of the winding pack. If is is assumed, for example, that winding pack 60 is to be assigned to partial coil 4 in FIG. 1, then these heating elements would be the elements designated 35 and 36 in FIG. 1. These elements are connected in parallel with different auxiliary resistors 28, 29 or to a single auxiliary resistor 28 and series resistor 55 at cold diode 53. The heating elements, in the form of metallized plastic films, are glued above the upper layer or below the lower layer of the winding pack. It is essential in this case for the connecting wires to lead in each case to the resistor which is connected with the respective end of the winding. By this means potential differences between the assigned partial coil and the heating element are limited to the resistive voltage of a single winding layer which is only a few volts. Bandage 63 is wrapped around winding pack 60 which contains heating elements 35 and 36.

According to a concrete embodiment of a pretection device corresponding to FIG. 1, this device is assigned to magnetic coil assembly 2 with six partial coils 3 to 8. With these coils whose total inductance amounts to 83 H, a field of 2 T is generated, in which case a rated current I of 382.5 A, with an average current density of about $99 \times 10^6$ A/m$^2$, flows through the conductors in the coils. A quantity of energy amounting to 6.1 MJ is stored in the coil assembly. The individual protective resistors 10 to 15 each have a value of about 0.45 ohms, while the auxiliary resistors are each about 0.05 ohms, and series resistor 55 at cold diode 53 is about 0.1 ohms. It is advantageous to use stainless steel as the material for the resistors. Surface heating elements 34 to 43 and 54 are made of metallized plastic films (such as thermofoil which is available from Minco Products Corp., Minneapolis, Minn. which have a resistance of about 2.5 ohms each. With a protection device of this type, in the event of a quench the individual voltages over a partial coil will then remain under 140 V, and the temperatures will not exceed 100° K.

There has thus been shown and described a novel protection device for a superconducting magnetic coil assembly which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. In a device for the protection of a superconducting magnetic coil assembly that is to be cryogenically cooled by a liquid coolant, when there is an unintended transition from the superconducting state to the normal conducting state, in which the magnetic coil assembly is subdivided into several partial winding sections that are connected one after another, with each of which a protective resistor with a predetermined ohmic value is connected in parallel in so that the ends of adjacent partial winding sections that face one another are connected to the corresponding ends of their respective protective resistors by a common section of an electrical conductor, the improvement wherein:
   (a) the protective resistors are located in a exhaust gas stream of the coolant;
   (b) in each section of the conductor that is common to adjacent partial winding sections there is located an auxiliary resistor whose ohmic value is smaller than that of each of the protective resistors connected to it; and
   (c) to each auxiliary resistance, two electrical heating elements are connected in parallel, which are in thermal contact with the two adjacent partial windings which are connected with the respective auxiliary resistor.

2. The device according to claim 1, wherein the auxiliary resistors are located in the exhaust gas stream of the coolant.

3. The device according to claim 1, wherein the ohmic value of each auxiliary resistor is at least 5 times smaller than the value of the protective resistor connected to it.

4. The device according to claim 1, wherein the ohmic value of each heating element is at least 10 times larger than that of the respective auxiliary resistor.

5. The device according to claim 1, wherein at least some of the auxiliary resistors are designed as heating elements.

6. The device according to claim 1, further comprising a superconducting persistent current switch useable for short-circuiting the partial winding sections of the magnetic coil asssembly that are connected one after the other.

7. The device according to claim 6, wherein the superconducting persistent-current switch is a short-circuit switch that is activated by means of a heating coil.

8. The device according to claim 6, wherein the superconducting persistent-current switch is cooled with the liquid coolant of the magnetic coil assembly.

9. The device according to claim 6, wherein the superconducting persistent-current switch is electrically connected in shunt in the operating state with at least one cooled protective element, which, in the event that the persistent-current switch becomes normally conducting, takes over at least the greater part of the operating current.

10. The device according to claim 9, wherein the cooled protective element is a mechanical short-circuit switch.

11. The device according to claim 10, wherein the short-circuit switch is cooled with the liquid coolant used to cool the magnetic coil assembly.

12. The device according to claim 9, wherein at least one diode is provided as a cooled protective element.

13. The device according to claim 12, wherein connected in series with the diode is at least one ohmic resistor, with which another electrical heating element with a greater ohmic value is connected in parallel at one of the partial windings of the magnetic coil assembly.

14. The device according to claim 13, wherein the diode and its series resistor are located in the exhaust gas stream of the coolant.

15. The device according to claim 1, wherein metalized plastic films are provided as the heating elements.

* * * * *